United States Patent [19]
Ribbens et al.

[11] Patent Number: 5,576,963
[45] Date of Patent: Nov. 19, 1996

[54] METHOD AND SYSTEM FOR DETECTING THE MISFIRE OF A RECIPROCATING INTERNAL COMBUSTION ENGINE UTILIZING A MISFIRE INDEX MODEL

[75] Inventors: William B. Ribbens, Ann Arbor, Mich.; Jaehong Park, Seoul, Rep. of Korea

[73] Assignee: Regents of the University of Michigan, Ann Arbor, Mich.

[21] Appl. No.: 324,596

[22] Filed: Oct. 18, 1994

[51] Int. Cl.$^6$ ................................................ G01M 15/00
[52] U.S. Cl. .................. 364/431.08; 364/431.07; 364/431.03; 73/117.3; 123/425; 123/436
[58] Field of Search .................. 364/431.08, 431.03, 364/431.01, 578, 431.04, 431.07; 123/416, 417, 420, 425, 479, 436, 419, 491; 73/117.3, 116, 112; 324/379

[56] References Cited

U.S. PATENT DOCUMENTS

| | | | |
|---|---|---|---|
| 4,821,194 | 4/1989 | Kawamura | 364/431.08 |
| 5,200,899 | 4/1993 | Ribbens et al. | 364/431.08 |
| 5,237,504 | 8/1993 | Holmes et al. | 364/431.08 |
| 5,239,473 | 8/1993 | Ribbens et al. | 364/431.08 |
| 5,278,760 | 1/1994 | Ribbens et al. | 364/424.1 |
| 5,287,282 | 2/1994 | Imai | 364/431.08 |
| 5,303,158 | 4/1994 | Kuroda | 364/431.08 |
| 5,339,245 | 8/1994 | Hirata et al. | 364/431.08 |
| 5,345,817 | 9/1994 | Grenn et al. | 364/431.07 |
| 5,359,518 | 10/1994 | Wimmer | 364/431.03 |
| 5,394,330 | 2/1995 | Horner | 364/431.03 |
| 5,446,664 | 8/1995 | Vossen et al. | 364/431.04 |
| 5,487,008 | 1/1996 | Ribbens et al. | 364/431.08 |
| 5,495,415 | 2/1996 | Ribbens et al. | 364/431.08 |
| 5,499,536 | 3/1996 | Wier et al. | 364/431.08 |

*Primary Examiner*—Kevin J. Teska
*Assistant Examiner*—Jacques H. Louis-Jacques
*Attorney, Agent, or Firm*—Brooks & Kushman P.C.

[57] ABSTRACT

A misfire index model-based method and system for detecting misfire in a reciprocating internal combustion engine having an engine cycle frequency in the frequency domain from crankshaft angular velocity. The misfire index model is a function of engine operating condition such as engine load and RPM. Crankshaft angular position is sensed to develop an electrical signal which is a function of the crankshaft angular velocity. The electrical signal contains data which is sampled. The sampled data is transformed to an equivalent frequency domain spectrum including frequency components of the engine cycle frequency and harmonics thereof. A load signal such as mass airflow and an RPM signal are generated. The magnitudes and/or phases of the frequency components and the load and RPM signals are supplied to the misfire index model in an appropriately programmed computer to distinguish between a true misfire and normal cyclic variability which characterizes the combustion process.

26 Claims, 3 Drawing Sheets

METHOD AND SYSTEM FOR DETECTING THE MISFIRE OF A RECIPROCATING INTERNAL COMBUSTION ENGINE UTILIZING A MISFIRE INDEX MODEL

CROSS-REFERENCE TO RELATED PATENTS AND APPLICATIONS

This application is related to the following issued patents: (1) "Method And System For Detecting The Misfire Of An Internal Combustion Engine Utilizing Angular Velocity Fluctuations", U.S. Pat. No. 5,200,899; (2) "Method And System For Detecting The Misfire Of An Internal Combustion Engine Utilizing Angular Velocity Fluctuations", U.S. Pat. No. 5,239,473; and (3) "Method And System For Detecting The Misfire Of An Internal Combustion Engine Utilizing Engine Torque Non-Uniformity", U.S. Pat. No. 5,278,760, all three of which are hereby expressly incorporated by reference in their entirety. This application is also related to patent applications entitled: (1) "Pattern Recognition-Based Method And System For Detecting The Misfire Of A Reciprocating Internal Combustion Engine", Ser. No. 154,271, filed Nov. 18, 1993, now U.S. Pat. No. 5,495,415; and (2) "Method And System For Detecting The Misfire Of A Reciprocating Internal Combustion Engine In The Frequency Domain", Ser. No. 023,342, filed Feb. 26, 1993, now U.S. Pat. No. 5,487,008.

TECHNICAL FIELD

This invention relates to methods and systems for misfire detection in a reciprocating internal combustion engine of a vehicle and, in particular, to methods and systems for detecting such misfires wherein a misfire index is modeled as a function of engine operating conditions.

BACKGROUND ART

There are a number of requirements for on-board diagnostics II (OBDII) of the California Air Resources Board (CARB). Once such requirement is the ability to detect misfires in the engine in order to identify a malfunction.

U.S. Pat. No. 5,200,899 noted above discloses instrumentation and computational procedures for detecting misfires in automotive engines such as is required by California Air Resources on-board diagnostic-II regulations.

Whereas normal engine combustion involves a certain level of torque nonuniformity, misfire significantly increases the nonuniformity. This nonuniformity can be readily observed in the frequency domain. Furthermore, the torque nonuniformity results in a nonuniformity in crankshaft angular speed.

The above-noted U.S. Pat. No. 5,487,008 discloses computational methods in which samples of crankshaft angular speed are obtained. Selected components for each complete engine cycle (i.e., crankshaft revolutions) of the spectrum are obtained using a suitable method (e.g. Fast Fourier Transform (FFT)).

Normally, the Fourier component at engine cycle frequency is sufficient to detect misfires although other components can be useful for certain powertrain configurations (e.g., the component at cylinder firing frequency). For this spectrum computation, the input sequence $\{w_k\}$ is obtained by sampling crankshaft angular speed w at uniformly spaced intervals of crankshaft angular position $\theta$:

$$w_k = w(\theta_k) \quad k = 1, 2, \ldots, K$$

$$\theta_k = \frac{4\pi k}{K}.$$

Various methods are available for noncontacting measurement of $w_k$ (as disclosed in U.S. Pat. No. 5,200,899).

Then, the pth Fourier complex amplitude $A_p$ is computed using a suitable algorithm. For example (although it is not computationally efficient), there is the well known discrete Fourier transform (DFT):

$$A_p = \sum_{k=1}^{K} w_k W_K^{pk} \quad p = 1, 2, \ldots, K.$$

where $$W_K = e^{-j\frac{2\pi}{K}}.$$

The complex amplitude at engine cycle frequency is $A_1$.

$$A_1 = M_1 e^{j\phi_1}$$

where $M_1$ is the amplitude and $\phi_1$ is the phase.

According to U.S. Pat. No. 5,200,899, misfire can be detected by applying a decision algorithm to this (these) component(s). For example, one such criterion is a simple threshold comparison of the amplitude of the engine cycle frequency ($M_1$).

$$M_1 < M_T \rightarrow \text{no misfire}$$

$$M_1 > M_T \rightarrow \text{misfire}$$

where $M_T$ is the threshold value. Alternatively, a decision algorithm in the $M_1$, $\phi_1$ plane can be used as disclosed in the above U.S. Pat. No. 5,487,008.

The above-noted U.S. Pat. No. 5,495,415 discloses misfire detection in automotive engines (primarily gasoline fueled, spark ignited reciprocating engines) and includes the steps of:

(1) obtaining noncontacting measurement of crankshaft angular speed;

(2) obtaining a sequence of samples of these measurements for an interval including one or more complete engine cycles;

(3) computing the spectrum of the sequence for one of more engine cycles by, for example, computing the discrete Fourier transform of the sequence; and (4) applying a decision algorithm.

Successful misfire detection has already been demonstrated with adaptive threshold. As described in application Ser. No. 08/154,271, the decision algorithm therein was implemented via a neural network that had as its input the misfire signature $A_1$, as well as several measurements related to operating condition (including mass airflow and RPM). This neural network (NN) was trained to recognize misfire from normal combustion on an engine cycle-by-cycle basis. The performance of the NN based misfire detection system, as represented by error rates, was compatible with OBDII requirements (within the scope of the tests).

One of the potential practical difficulties associated with neural network decision logic is the relatively large computational burden. In order to be practically useful, any misfire detection system must detect misfires in real-time. Ideally, any computations required for misfire detection should be performed using existing (onboard) computers (e.g., engine control or chassis computers). The computational capability of such onboard computers is limited such that a real-time neural network could potentially exceed the capacity of the computer.

SUMMARY OF THE INVENTION

An object of the present invention is to provide an adaptive computationally efficient method and system for misfire detection from crankshaft angular velocity in the frequency domain wherein errors in detecting misfires are reduced to basically zero for input operation over a full range of powertrain operating conditions.

Another object of the present invention is to provide a computationally efficient method and system for misfire detection from crankshaft angular velocity in the frequency domain wherein optimal system performance (i.e., minimum errors) is provided by utilizing a decision algorithm which has a threshold which is adaptive with engine operating conditions. Typically, the threshold conditions on the Fourier component(s) used in the decision algorithm vary with RPM and load on the engine. The latter can be represented by a suitable measurement for the particular vehicle (e.g., mass airflow, manifold pressure, throttle position). Such measurements are routinely made for engine control purposes in modern automotive engines.

Still another object of the present invention is to provide a computationally efficient method and system for misfire detection which complies with OBDII of the CARB.

In carrying out the above objects and other objects of the present invention, a method is provided for detecting the misfire of a reciprocating internal combustion engine with a misfire index model which is a function of engine operating conditions. The engine includes a plurality of reciprocating components having an engine cycle frequency, at least one cylinder and a crankshaft. The method includes the step of generating an electrical signal as a function of crankshaft angular velocity. The electrical signal contains data. The method also includes the steps of sampling the data synchronously with crankshaft angular position at a sampling rate to obtain sampled data and transforming the sampled data to an equivalent frequency domain spectrum, including frequency components having complex amplitudes at the engine cycle frequency and harmonics thereof. The method includes the step of forming a misfire index based on the complex amplitudes. Finally, the method includes the step of applying a threshold algorithm to the misfire index. The threshold algorithm distinguishes between a true misfire and normal cyclic variability which characterizes the combustion process in each cylinder of the engine to thereby obtain a misfire signal. The step of applying includes the step of applying the misfire index to the misfire index model to identify the misfire.

Preferably, the threshold algorithm is a mathematical function of engine operating conditions (for example, having mass air flow and RPM as independent variables).

Further in carrying out the above objects and other objects, a system is provided for carrying out the above method steps.

The above objects and other objects, features, and advantages of the present invention are readily apparent from the following detailed description of the best mode for carrying out the invention when taken in connection with the accompanying drawings.

BRIEF DESCRIPTION OF THE BEST MODE

In general, the apparatus of the present application is the same as the apparatus disclosed in the above-noted U.S. Pat. No. 5,239,473 and U.S. Pat. No. 5,495,415 which includes a noncontacting sensor for measuring crankshaft angular speed (i.e. $\omega$) and another that generates a timing reference for each individual engine cycle (e.g., a noncontacting sensor coupled to a mark on the camshaft). In addition, instrumentation for obtaining a sequence of samples ($\omega_k$: k=1, 2, ... , K) of crankshaft angular speed. The instrumentation further includes a program and computer capable of making various computations on the sequence $\{\omega_k\}$ and for detecting misfires within each engine cycle.

Figure 1:
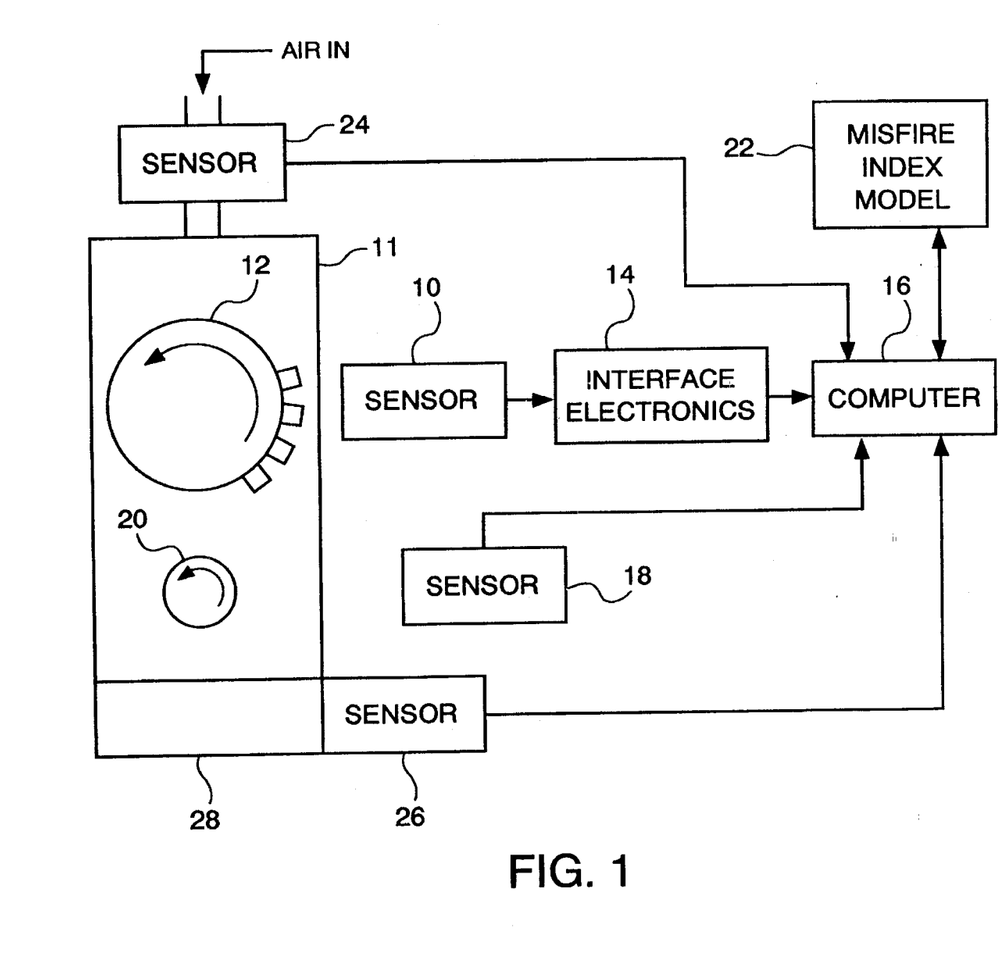
FIG. 1 is a schematic block diagram illustrating a system constructed in accordance with the present invention.

Referring now to the drawing figures, there is illustrated in FIG. 1 the components of a misfire detection system constructed in accordance with the present invention. In particular, a sensor 10 is positioned such that it responds to the angular position or angular speed of a crankshaft 12 of a reciprocating internal combustion engine 11. Electronic circuitry in the form of interface electronics 14 permit data samples to be read by the computer 16. For example, a continuous time analog of angular speed can be generated in which:

$$v = k\omega_e$$

where $\omega_e$ is instantaneous crankshaft angular speed, v is the output voltage and k is a constant. A discrete time sampled version of this signal may alternatively be obtained, and is the preferred method.

A computer 16 makes computations necessary to detect misfire. These computations are explained below and include the capability of computing the spectrum of the crankshaft angular speed. The computer may employ, for example, a microprocessor configured to perform computations under program control. The program can, for example, conveniently be stored in a ROM memory chip.

The present method utilizes samples of crankshaft angular speed as will presently be shown. These samples are sufficiently accurate for the procedures explained below with a relatively low number of samples per engine revolution. Such samples (denoted $\hat{\omega}_k$)

for the kth sample are obtained using a multi-toothed structure connected to the crankshaft 12 and the non-contacting sensor. Letting $M_T$ be the number of teeth, then:

$$\omega_k = \frac{2\pi}{M_T(t_k - t_{k-1})}$$

where $t_k$=time the kth tooth passes the sensor. In this expression, the angular interval is the angle between a successive pair of teeth, i.e., $$\frac{2\pi}{M_T}.$$

Such samples are obtained in discrete time by measuring the time for the passage of an interval of crankshaft rotation.

In the present method and system, misfire is detected by examining the spectrum of the crankshaft angular speed signal. This signal may be obtained by any of the instrumentation methods outlined in the above-noted related patents and applications or by any applicable discrete time estimation method.

The spectrum of the angular speed signal may be computed using any one of a variety of commonly known techniques (e.g., discrete Fourier transform DFT or fast Fourier transform (FFT)). In this procedure, a sample of the crankshaft angular speed signal is obtained. The duration of this sample can be chosen to be a multiple of crankshaft revolutions.

By way of illustration, it is convenient to consider the spectrum as obtained by the discrete Fourier transform (DFT). For this purpose, the crankshaft angular speed is sampled at discrete instants of time or at discrete crankshaft angles for any given engine cycle or integer multiple of an engine cycle:

$$\omega_n = \omega(t_k) \quad k=0, 1, 2 \ldots K$$

or $$\omega_n = \omega(\theta_k) \quad k=0, 1, 2, \ldots K$$

where K is the number of samples in the observation period (e.g. one complete engine cycle). These samples are obtained for a time interval T or a crankshaft angle θ. The spectrum for this set of samples is represented by the complex number $A_p$:

$$A_p = \sum_{k=0}^{K} \omega_k (W_K)^{pk} \quad p = 0, 1, \ldots K.$$

where $$W_K = \exp\left[ j\left(\frac{2\pi}{K}\right) \right]$$

The complex values of $A_p$ represents the magnitude and phase of the Fourier component of frequency $f_p$:

$$f_p = p/\tau.$$

For example, p=1 corresponds to the fundamental frequency for the time interval [0,T] or the crankshaft angular interval [0,4π].

Obviously, this algorithm is only exemplary. Other candidates include FFT which is faster and is applicable if K is a power of 2 (for example, $K=2^6$).

For certain applications, a time interval (or crankshaft interval) of two complete crankshaft revolutions corresponding to the one complete engine cycle for a 4 stroke/cycle reciprocating internal combustion engine is used. Other choices for this sample will also suffice such as four complete revolutions corresponding to two engine cycles. Such choice is beneficial for detecting isolated single misfire events, for example.

In this method, the complete spectrum need not be computed. Rather, only a few Fourier components are needed. One convenient choice is to compute the fundamental Fourier component at frequency $f_1$ for a complete engine cycle, i.e., T is the period for two complete crankshaft revolutions. In this case, $f_1$ is the fundamental frequency of a Fourier analysis of angular speed for a duration of one complete engine cycle and can conveniently be called engine cycle frequency. Also of interest is the component at N times this frequency ($f_c$) where N=number of cylinders ($f_c=Nf_1$). The Fourier amplitude at engine cycle frequency $f_1$ is $M_1$ and at cylinder firing frequency (i.e., $f_n$) is $M_N$ for a N cylinder engine and for a period T corresponding to one engine cycle (two crankshaft revolutions).

In one embodiment, it is possible to identify individual misfiring cylinder(s) by means of an engine cycle signal generated by a sensor 18 which is activated by a specific point on the engine camshaft 20, as illustrated in FIG. 1. For example, a magnetic sensor can be positioned close to a lug on the camshaft 20. A voltage pulse is then generated each time this lug rotated past the sensor axis. This algorithm is discussed in greater detail hereinbelow.

An averaged measure of engine load such as mass airflow (MAF) or manifold pressure depending upon the engine control configuration for the specific vehicle application is provided by a sensor 24. Also, a sensor 26 is coupled to a transmission 28 of the engine 11 to provide a signal indicating the transmission gear.

Additionally, the spectrum can be computed for a sample of duration for two complete engine cycles. In this case, a convenient choice for misfire detection is the fundamental frequency $f_1$, the second harmonic $f_2=2f_1$ and the harmonic at cylinder firing frequency $f_c=2Nf$.

Misfire can also be detected from the Fourier components via electronic circuitry. For example, one embodiment of the present invention incorporates a computer which performs calculations to obtain the Fourier components of crankshaft angular speed. This computer can detect misfire via one of many algorithms.

Misfires can be detected under most operating conditions from only the fundamental component (i.e., $A_1$). The magnitude ($M_1$) of the complex number $A_1$ provides an index of misfire as described in U.S. Pat. No. 5,495,415 and the individual misfiring cylinder can be found from the phase $\phi_1$ of this complex number. The index of misfire may also be termed a "misfire signature".

As disclosed in the above-noted patent applications, misfire signature (i.e., $A_1$) varies widely with operating condition. For practical purposes of the present example of misfire detection, the operating condition is specified by RPM and load (as expressed by mass airflow (MAF)).

However, operating condition can be advantageously expressed by using more variables to represent the operating conditions as well as more complex amplitudes $A_p$ for certain applications of the present method to certain classes of engines. Additional variables might include the manifold absolute pressure (MAP), throttle angular position (TP), etc., to represent operating condition and $A_N$ as well as $A_1$ (N=number of cylinders).

The actual detection of misfires requires application of a decision algorithm to the misfire signature. Although there are many potential decision algorithms; in practice, a simple threshold comparison has proven to be adequate for meeting OBDII requirements as well as simple to implement. For example, one decision algorithm is given below:

$$M_1 < M_{th} \Rightarrow \text{normal combustion}$$
$$M_1 > M_{th} \Rightarrow \text{misfire}$$

where $M_{th}$=threshold level $M_1=|A_1|$=magnitude of complex number $A_1$.

The performance of any such decision algorithm is given by its error rates. The two errors made by any threshold decision are: 1) false alarm, and 2) missed detection. A false alarm is an incorrect misfire detection when combustion was normal. A missed detection is an incorrect decision of normal combustion when misfire occurred.

The performance of any decision algorithm is optimized if the threshold level adapts with operating condition (i.e., $M_{th}(x)$) where x is a vector of operating condition variables. In addition, such adaptation must be dynamic owing to the normal time varying operating conditions of the vehicle powertrain in typical driving circumstances.

A decision algorithm of the present invention is based upon modeling the misfire signature as a function of operating conditions. The misfire signature variable is only meaningfully modeled using regression analysis since it is a random variable. Denoting the function representing misfire $f_m$ and the function representing normal combustion $f_n$, and denoting the vector of operating condition variables x, the goal of this analysis is to find functions $f_m(x)$ and $f_n(x)$ which best fit the data.

The present invention is a misfire detection system having the instrumentation as described above but with an alternate decision algorithm that is more computationally efficient than the neural network. In the present method, the misfire signature is modeled as a function ($f_m$) of operating condition. Normal combustion is represented by a second function ($f_n$) of operating condition. For example, if operating condition can be sufficiently represented by RPM and MAF, then misfire is characterized by a function $f_m$ (RPM, MAF). That is, $f_m$ is a surface in a three-dimensional coordinate system. Similarly, normal combustion is represented by a second function $f_n$ (RPM, MAF).

The process of generating these functions involves finding the surface that best fits experimental data for a wide variety of tests. As explained in the above-noted U.S. Pat. Nos. 5,200,899 and 5,239,473, any misfire signature (e.g., $A_1$) is a random process. Consequently, the surfaces $f_m$ and $f_n$ are typically found using a least square error method regression analysis or some equivalent method.

The mathematical theory and examples of this process are explained in the appendix below.

Figure 2:
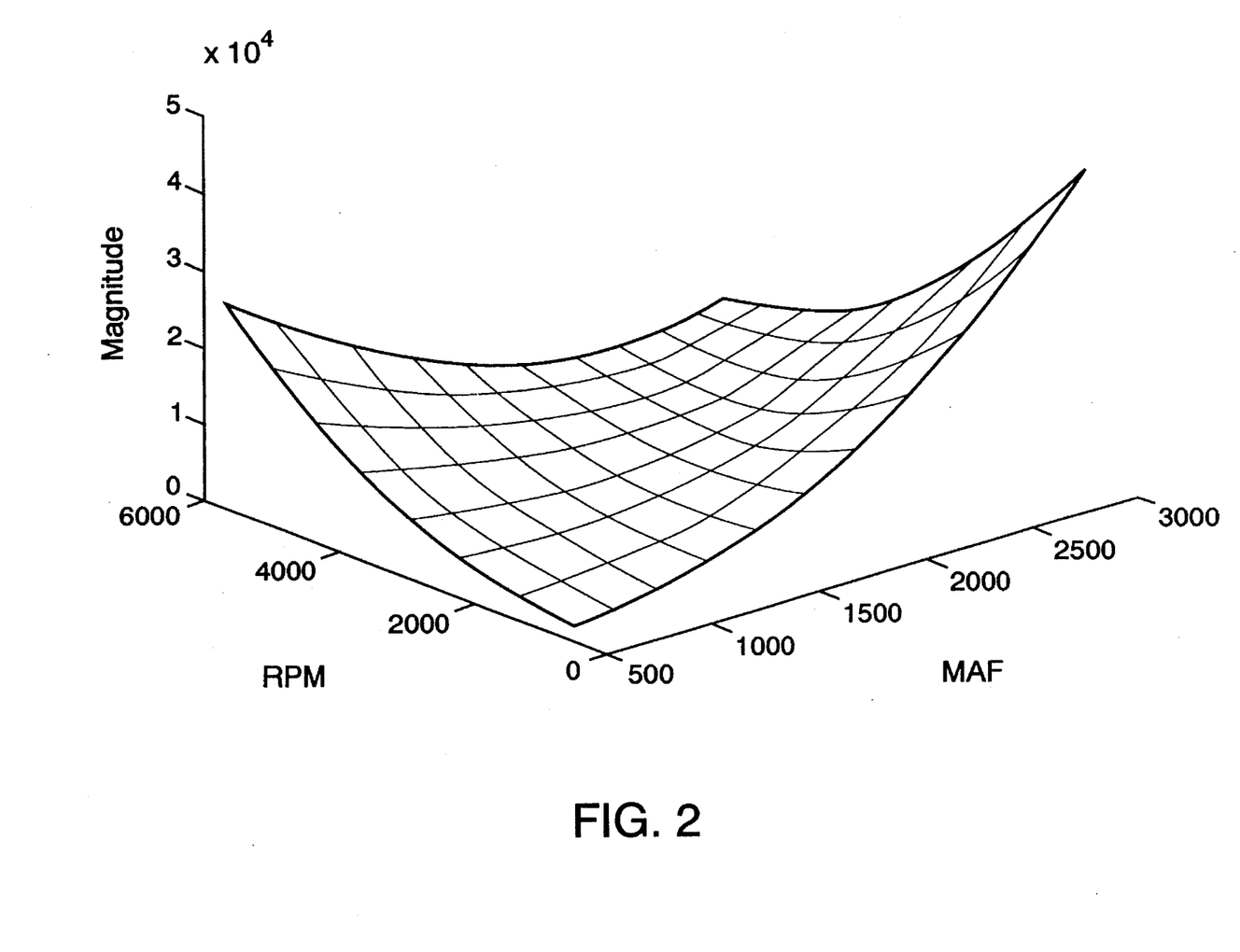
FIG. 2 is a graph of a model surface for use in the method and system of the present invention and which is a function of RPM and MAF.
Figure 3:
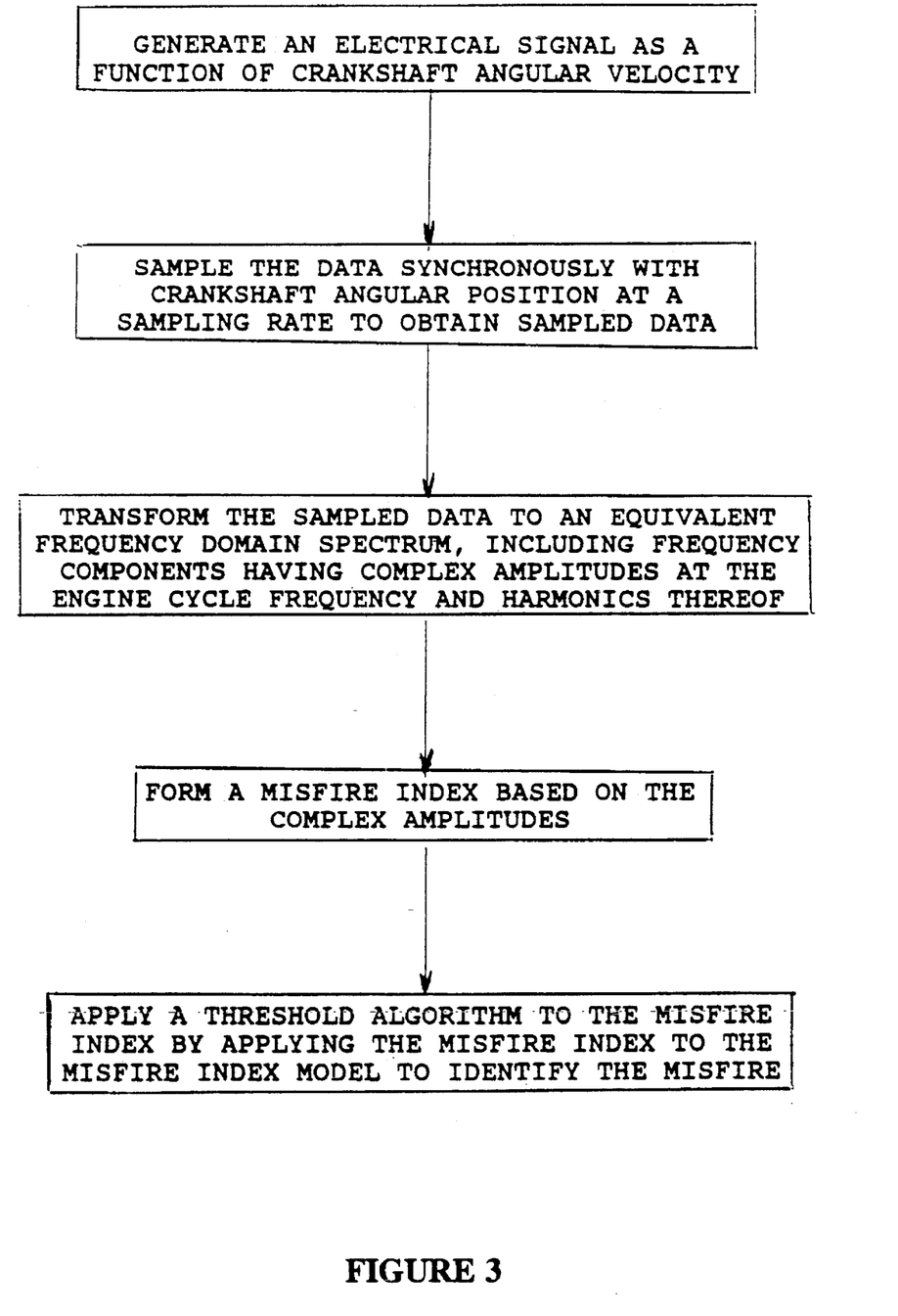
FIG. 3 is a block diagram flowchart illustrating the method steps of the present invention.

Also explained in the appendix are certain advantageous ways to proceed with the generation of these functions. One such way is to improve the fit of the data using coordinate transformations. However, regardless of mathematical details, the surfaces $f_m$ and $f_n$ should be the "best fit" to the data in terms of having the least sum of squared distances from actual data to the functions $f_m$ and $f_n$. The data should encompass a wide variety of experimental tests including operation on rough roads with torque converter locked for cars having an automatic transmission as well as tests conducted with manual transmission equipped samples with manual transmission (having worst case errors due to road roughness induced errors). Moreover, the experimental tests should involve data covering the entire operating envelope for the engine and with the transmission in all of the possible gear selections and at various vehicle weights. An example of $f_m$ is shown in FIG. 2. The normal combustion function is a plane $f_n=600$ for all RPM and MAF.

Once the two functions have been established for a given vehicle configuration (i.e., a given model with specific powertrain), it will be valid for all production vehicles of that configuration. The misfire detection algorithm for this scalar example will be a simple threshold test:

$M_1<M_{th} \Rightarrow$ normal combustion $M_1>M_{th} \Rightarrow$ misfire

The threshold level in this case is a linear combination of $f_m$ and $f_n$:

$M_{th}=pf_m+(1-p)f_n$ where $0<p<1$.

This choice of threshold makes it possible to adjust the relative magnitudes of the two errors: false alarm (fa) and missed detection (md).

It should be recognized that the present example is readily extended to higher dimensional spaces. That is, the operating condition can be represented by more variables than RPM and MAF. Furthermore, the misfire index itself can be multivariable. For example, the above-noted applications show that the complex amplitude $A_1$:

$A_1=M_1 \, e^{j\phi}$ provides a basis for misfire detection in which the misfiring cylinder is readily identified. It will be well recognized by one skilled in regression analysis or least squared fitting of data that such multivariable representations is part of existing theory.

However, to be useful for misfire detection in automobile engines, this algorithm applies to the instrumentation described earlier herein.

While the best mode for carrying out the invention has been described in detail, those familiar with the art to which this invention relates will recognize various alternative designs and embodiments for practicing the invention as defined by the following claims.

APPENDIX

Misfire Detection with Functional Decision Algorithm

Experience has shown that the misfire signature (i.e., $A_1$) varies widely with operating conditions. For the practical purposes of misfire detection, the operating condition is specified by the two-dimensional vector x where:

$$x = \begin{bmatrix} MAF \\ RPM \end{bmatrix} \in R^2.$$

The actual detection of misfires requires application of a decision algorithm to the misfire signature. Although there are many potential decision algorithms, in practice, a simple threshold comparison has proven to be adequate for meeting OBDII requirements as well as simple to implement. For example, one decision algorithm is given below:

$M_1<M_{th} \Rightarrow$ normal combustion $M_2>M_{th} \Rightarrow$ misfire where $M_{th}$=threshold level $M_1=|A_1|$ The performance of any such decision algorithm is given by its error rates. The two errors made by any threshold decision are: 1) false alarm and 2) missed detection. A false alarm is an incorrect misfire decision when combustion was normal. A missed detection is an incorrect decision of normal combustion when misfire occurred.

The performance of any decision algorithm is optimized if the threshold level adapts with operating condition (i.e., $M_{th}$ (x)). In addition, such adaptation must be dynamic owing to the normal time varying operating conditions of the vehicle powertrain in typical driving circumstances.

Successful misfire detection has already been demonstrated with adaptive threshold. In this work, the decision algorithm was a neural network that had as its input the misfire signature $A_1$ as well as several measurements related to operating condition (including mass airflow and RPM).

This neural network (NN) was trained to recognize misfire from normal combustion on an engine cycle-by-cycle basis. The performance of the NN based misfire detection system, as represented by error rates, was compatible with OBDII requirements (within the scope of the tests).

One of the potential practical difficulties associated with neural network decision logic is the relatively large computational burden. In order to be practically useful, any misfire detection system must detect misfires in real-time. Ideally, any computations required for misfire detection should be performed using existing (onboard) computers (e.g., engine control or chassis computers). The computational capability of such onboard computers is limited such that a real-time neural network could potentially exceed the capacity of the computer.

An alternative to the neural network decision algorithm is based upon modeling the misfire signature as a function of operating conditions. The misfire signature variable is only meaningfully modeled using regression analysis since it is a random variable. Denoting the function representing misfire $f_m$ and the function representing normal combustion $f_n$, the goal of this analysis is to find functions $f_m(x)$ and $f_n(x)$ which best fit the data.

Although the index for misfire can be vector valued, we illustrate the principles of the present misfire with a scalar index. We take for this index the magnitude of the fundamental component $A_1$ of the spectrum of $\{\omega_k\}$ as explained above.

Denoting the index under misfiring conditions $i_m(j)$ and the index under normal conditions $i_n(j)$ for the jth engine cycle, we have:

$$i_m(j)=|A_1(j)| \text{ with induced misfire,}$$

$$i_n(j)=|A_1(j)| \text{ normal combustion.}$$

The operating condition is represented by an n-dimensional vector $x(j)$:

$$x \epsilon R^n.$$

The indices of combustion and operation condition are:

$$i_m(j), x(j) \text{ induced misfire}$$

$$j=1, 2, \ldots, N_m$$
and $$i_n(j), x(j) \text{ normal combustion}$$

$$j=1, 2, \ldots, N_n$$

where $N_m$ is the number of engine cycles with induced misfire and $N_n$ is the number of normal combustion engine cycles in the data set. The intention, then, is to find the best fit between the data and a pair of functions $f_m(x)$ and $f_n(x)$ such that $J_m$ and $J_n$ are minimized where:

$$J_m = \sum_{j=1}^{N_m} \{i_m(j) - f_m[x(j)]\}^2$$

$$J_n = \sum_{j=1}^{N_n} \{i_n(j) - f_n[x(j)]\}^2.$$

It should be noted that for both misfire and normal combustion, the domain of $f_n, f_m$ is $N_n$, $N_m$ dimensional. The ratio of given data points to data points at the domain is:

$$\frac{N_i}{N_i^n} \quad i = m, n.$$

This ratio can be very small as $N_i$ becomes large. It is possible to reduce the domain dimensionally through coordinate transformation. In this case, the ratio $N_i/N_i^n$ can be increased (for a given data set).

If the original operating conditions for the jth engine cycle is $x(j)$, then the transformed vector is $n'(j)$ $$x'(j)=Tx_j+A$$

where
$T \epsilon R^{n \times n}$
$A \epsilon R^n$.

We search for a transformation (T,A) such that $x' \epsilon R^{n'}$ where $n'<n$.

In the example considered in this Appendix, we choose a two-dimensional vector x:

$$x = \begin{bmatrix} RPM \\ MAF \end{bmatrix}$$

where RPM is the crankshaft angular speed (revolutions per minute) and MAF is the mass flow rate of air into the engine (in Kg/sec).

For the purpose of illustrating the present method, the functions $f_m$ and $f_n$ were developed from a subset of data (called training data) in which $N_m=N_n$ (although this choice is merely for computational convenience).

Typically, the index for misfire averages about an order of magnitude larger than for normal combustion.

Examination of this data suggests that a transformation to a new origin and a rotation reduces dimensionality of the data domain.

Using this transformation, the misfire index as a function of transformed MAF which we denote Y has a shape that can be best fit with a quadratic.

It has been observed that the function for normal combustion can best be represented by a plane z=constant.

The function $z=f_m(x')$ that best fits this particle data is:

$$z=0.006287(Y+537.8996)^2+2521.5.$$

Furthermore, when the transformed MAF (Y) is fixed, the function z is linear in rotated RPM. Graphs suggest that the complete function is fit by a function of the form:

$$z=0.006287(Y+537.8996)^2+2521.5+a(Y)x+b(Y).$$

The structure of the data is such that one can reasonably expect a fit to parameters that are linear in Y:

$$a(Y)=a_1Y+a_2$$

$$b(Y)=b_1Y+b_2.$$

The values for these parameters as found by regression analysis are:

$a_1=-0.0014$
$a_2=0.0523$
$b_1=4.1485$
$b_2=-375.670.$

The function that best fits misfire data is given by:

$$f_m=0.006287(Y+537.8996)^2+2521.5+(-0.0014Y+0.0523)x-4.1485Y-375.67.$$

The function can then be transformed back to the original coordinates of actual RPM (which is denoted R) and MAF (denoted M):

$$f_m = 0.001\ R^2 + 0.0053M^2 - 0.0048\ RM + 0.8095r + 1.5291m - 1637.6.$$

Normal Combustion Representation

The misfire index data for normal combustion is essentially a random process. A statistical examination of the training data reveals that 90% of the misfire index values are less than 500. There is no discernible pattern with respect to operating condition. Consequently, we have taken our function $f_n(x)$ to be a plane of constant magnitude:

$$f_n(x) = 600\ \forall x.$$

Decision Function

The threshold decision boundary for misfire ($z_{th}$) is a linear combination of $f_m(x)$ and $f_n(x)$ having the form:

$$z_{th}(x) = pf_m(x) + (1-p)f_n(x)$$

where $p \in [0,1]$.

The parameter p is a weighting function that is chosen to influence the relative false alarm and missed detection error rates. This weighting parameter would typically be chosen by the car maker to achieve a desired balance between these two error types.

Experimental Test of the Misfire Detection System

The performance of the misfire detection system was experimentally examined using the function based decision algorithm. In these tests, the input data sets included sequences of sampled crankshaft angular position $\{\omega_k | k=1, 2, \ldots, K\}$. The misfire index for these tests was $M_1$ where:

$$M_I = |A_I|$$

$$A_p = \sum_{k=1}^{K} \omega_k W_K^{pk} \quad p = 1, 2, \ldots, K$$

$$W_K = e^{j2\pi/K}.$$

Tests have been conducted for three decision parameter values: p=0.7, 0.5, 0.3. The test set consisted of 39,774 cycles with misfire and 40,698 normal combustion cycles.

1. When p=0.7: missed detection is 900 points out of 39,774 points and the missed detection rate is 2.26%. The false alarm is 22 points out of 40,698 points and the false alarm rate is 0.054%.
2. When p=0.5: missed detection is 125 points out of 39,774 points and the missed detection rate is 0.31%. The false alarm is 37 points out of 40,698 points and the false alarm rate is 0.091%.
3. When p=0.3: missed detection is 2 points out of 39,774 points and the missed detection rate is 0.005%. The false alarm is 101 points out of 40,698 points and the false alarm rate is 0.25%.

What is claimed is:

1. A method for detecting the misfire of a reciprocating internal combustion engine with a misfire index model which is a function of engine operating condition, the engine including a plurality of reciprocating components having an engine cycle frequency, at least one cylinder and a crankshaft, the method comprising the steps of:

generating an electrical signal as a function of crankshaft angular velocity, the electrical signal containing data;

sampling the data synchronously with crankshaft angular position at a sampling rate to obtain sampled data;

transforming the sampled data to an equivalent frequency domain spectrum, including frequency components having complex amplitudes at the engine cycle frequency and harmonics thereof;

forming a misfire index based on the complex amplitudes; and applying a threshold algorithm to the misfire index, which threshold algorithm distinguishes between a true misfire and normal cyclic variability which characterizes the combustion process in each cylinder of the engine to thereby obtain a misfire signal, the step of applying including the step of applying the misfire index to the misfire index model to identify the misfire.

2. The method of claim 1 wherein the threshold algorithm is a mathematical function of engine operating condition.

3. The method of claim 2 wherein the threshold algorithm has mass air flow to the engine and engine RPM as independent variables.

4. The method of claim 1 wherein the frequency components have magnitudes and phases and wherein the magnitudes and phases of the frequency components are applied to the misfire index model to identify the misfire.

5. The method of claim 1 wherein the step of forming includes the step of determining the magnitudes of the complex amplitudes and wherein the step of applying the misfire index includes the step of comparing the magnitudes of the complex amplitudes to an adaptive threshold level.

6. The method of claim 1 wherein the misfire index model includes a combination of two functions which establish an adaptive threshold level and wherein the step of applying the misfire index includes the step of comparing the magnitudes of the complex amplitudes to the adaptive threshold level.

7. The method of claim 6 wherein the adaptive threshold level is a function of at least one engine operating condition.

8. The method of claim 1 further comprising the step of generating a load signal based on engine load, wherein the at least one operating condition includes engine load.

9. The method of claim 8 wherein the load signal is based on mass airflow to the engine.

10. The method of claim 8 wherein the engine has a manifold and wherein the load signal is based on manifold pressure.

11. The method of claim 8 wherein the adaptive threshold level is the function of engine RPM and further comprising the step of generating an RPM signal based on the speed of the engine.

12. The method of claim 8 wherein the operating conditions further include engine manifold absolute pressure.

13. The method of claim 8 wherein the operating conditions further include engine throttle angle position.

14. A system for detecting the misfire of a reciprocating internal combustion engine including a plurality of reciprocating components having an engine cycle frequency, at least one cylinder and a crankshaft, the system comprising:

means for generating an electrical signal as a function of crankshaft angular velocity, the electrical signal containing data;

means for sampling the data synchronously with crankshaft angular position at a sampling rate to obtain sampled data;

means for transforming the sampled data to an equivalent frequency domain spectrum, including frequency components having complex amplitudes at the engine cycle frequency;

means for forming a misfire index based on the complex amplitudes; and means for applying a threshold algorithm to the misfire index, which threshold algorithm distinguishes between a true misfire and normal cyclic variability which characterizes the combustion process in each cylinder of the engine to thereby obtain a misfire signal, the means for applying including a misfire index model for receiving the misfire index and generating an output signal to identify the misfire.

15. The system of claim 14 wherein the threshold algorithm is a mathematical function of engine operating condition.

16. The system of claim 15 wherein the threshold algorithm has mass air flow to the engine and engine RPM as independent variables.

17. The system of claim 14 wherein the frequency components have magnitudes and phases and wherein the magnitudes and phases of the frequency components are applied to the misfire index model to identify the misfire.

18. The system of claim 14 wherein the means for forming includes means for determining the magnitudes of the complex amplitudes and wherein the means for applying the misfire index includes means for comparing the magnitude of the complex amplitudes to an adaptive threshold level.

19. The system of claim 14 wherein the misfire index model includes a combination of two functions which establish an adaptive threshold level and wherein the means for applying the misfire index includes means for comparing the magnitudes of the complex amplitudes to the adaptive threshold level.

20. The system of claim 19 wherein the adaptive threshold level is a function of at least one engine operating condition.

21. The system of claim 14 further comprising the means for generating a load signal based on engine load, wherein the at least one operating condition includes engine load.

22. The system of claim 21 wherein the load signal is based on mass airflow to the engine.

23. The system of claim 21 wherein the engine has a manifold and wherein the load signal is based on manifold pressure.

24. The system of claim 21 wherein the adaptive threshold level is the function of engine RPM and further comprising means for generating an RPM signal based on the speed of the engine.

25. The system of claim 21 wherein the operating conditions further include engine manifold absolute pressure.

26. The system of claim 21 wherein the operating conditions further include engine throttle angle position.

* * * * *